United States Patent
Wang (10) Patent No.: US 12,288,051 B2
(45) Date of Patent: Apr. 29, 2025

(54) METHOD AND APPARATUS FOR PROCESSING MIRROR IMAGES OF AI PLATFORM

(71) Applicant: INSPUR SUZHOU INTELLIGENT TECHNOLOGY CO., LTD., Jiangsu (CN)

(72) Inventor: Jiyu Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 56 days.

(21) Appl. No.: 18/012,934

(22) PCT Filed: Jul. 29, 2021

(86) PCT No.: PCT/CN2021/109216
§ 371 (c)(1),
(2) Date: Dec. 25, 2022

(87) PCT Pub. No.: WO2022/052657
PCT Pub. Date: Mar. 17, 2022

(65) Prior Publication Data
US 2023/0266956 A1 Aug. 24, 2023

(30) Foreign Application Priority Data
Sep. 11, 2020 (CN) .......................... 202010955468.1

(51) Int. Cl.
*G06K 9/00* (2022.01)
*G06F 3/01* (2006.01)
(Continued)

(52) U.S. Cl.
CPC .............. *G06F 8/63* (2013.01); *G06F 16/116* (2019.01); *G06N 20/00* (2019.01)

(58) Field of Classification Search
CPC .......... G06F 8/63; G06F 16/116; G06N 20/00
See application file for complete search history.

(56) References Cited

U.S. PATENT DOCUMENTS

| 2008/0201705 A1* | 8/2008 | Wookey ................. G06F 8/658 717/175 |
| 2019/0230129 A1* | 7/2019 | Digiambattista ... H04L 63/1441 |

(Continued)

FOREIGN PATENT DOCUMENTS

| CN | 106302632 A | * | 1/2017 | ............... G06F 8/61 |
| CN | 108089888 A | * | 5/2018 | ............... G06F 8/61 |

(Continued)

OTHER PUBLICATIONS

English translation of CN 109857475 B By LVX, A Frame Management Method and Device. (Year: 2018).*

(Continued)

*Primary Examiner* — S. Sough
*Assistant Examiner* — Mohammad H Kabir
(74) *Attorney, Agent, or Firm* — IPro, PLLC (57) ABSTRACT

Disclosed is a method and device for processing mirror images of an AI platform, including: scanning a file used for building a mirror image to detect whether a format and syntax of the file are correct, and building the mirror image according to the file if the format and syntax are correct; selecting and installing a component required for mirror image training; adjusting queue positions of mirror images to be imported according to priorities of the mirror images, and importing the mirror images according to the queue positions; classifying and recommending mirror images, and performing a model training according to the mirror images selected; and in response to detecting that a storage of mirror (Continued)

images in a local disk space reaches a preset cleaning threshold, screening the mirror images, and cleaning mirror images screened out.

17 Claims, 2 Drawing Sheets

(51) Int. Cl.
*G06F 8/61* (2018.01)
*G06F 16/11* (2019.01)
*G06K 9/62* (2022.01)
*G06N 20/00* (2019.01)

(56) References Cited

U.S. PATENT DOCUMENTS

| | | | |
|---|---|---|---|
| 2020/0226212 A1 | 7/2020 | Tan et al. | |
| 2020/0334066 A1* | 10/2020 | Jin | G06F 9/00 |
| 2021/0056306 A1* | 2/2021 | Hu | G06V 40/193 |

FOREIGN PATENT DOCUMENTS

| | | | | |
|---|---|---|---|---|
| CN | 108390920 A | | 8/2018 | |
| CN | 108401031 A | | 8/2018 | |
| CN | 109032625 A | * | 12/2018 | G06F 8/61 |
| CN | 109246234 A | | 1/2019 | |
| CN | 109508238 A | | 3/2019 | |
| CN | 110647580 A | | 1/2020 | |
| CN | 110673860 A | | 1/2020 | |
| CN | 111367869 A | | 7/2020 | |
| CN | 112130869 A | | 12/2020 | |
| CN | 109586999 B | * | 3/2021 | H04L 41/0246 |
| IN | 109857475 A | | 6/2019 | |
| JP | 2005505050 A | * | 2/2005 | G06F 15/16 |
| JP | 4325836 B2 | * | 9/2009 | G06F 11/2058 |
| WO | WO-2020068831 A1 | * | 4/2020 | G06F 16/9024 |
| WO | WO-2020134364 A1 | * | 7/2020 | G06F 9/45558 |
| WO | WO-2021042790 A1 | * | 3/2021 | G01N 21/90 |

OTHER PUBLICATIONS

English translaton of CN 108089888 A by Yang, A File System-based Application Operation Method and System (Year: 2016).*
English translation of CN 106302632 A by Wang, A Foundation Image Downloading Method and a Management Node (Year: 2016 ).*
English translation of CN 109586999 B by Ji, A Container Cloud Platform State Monitoring Pre-warning System, Method and Electronic Device (Year: 2018).*
English translation of JP 2005505050 A by Mukundan, Method, apparatus and system for performing view caching in a framework for supporting web-based applications (Year: 2002).*
English translation of JP 4325836 B2, byWatanabe, Data Synchronization Method for Multiple Remote Storage (Year: 2002).*
English translation of CN 109032625 A by Hao, A Software Continuous Integrated Method and Device (Year: 2018).*
English version—LVX.*
English translation of WO 2021042790 A1 by Chen, Master Node, Slave Node, System and Method for Distributed Container Cluster Mirroring Management (Year: 2020).*
English translation of WO 2020134364 A1 by Kong, Virtual Machine Migration Method, Cloud Computing Management Platform, and Storage Medium (Year : 2019).*
PCT/CN2021/109216 international search report.

* cited by examiner

METHOD AND APPARATUS FOR PROCESSING MIRROR IMAGES OF AI PLATFORM

CROSS-REFERENCE TO RELATED APPLICATIONS

The present application is a National Stage of International Application No. PCT/CN2021/109216, filed on Jul. 29, 2021, which claims priority to Chinese Patent Application No. 202010955468.1, submitted to the China National Intellectual Property Administration on Sep. 11, 2020, entitled "METHOD AND DEVICE FOR PROCESSING MIRROR IMAGES OF AI PLATFORM", which is incorporated herein by reference in its entirety.

TECHNICAL FIELD

The present disclosure relates to the field of computer technology, more particularly to a method and device for processing mirror images of an artificial intelligence (AI) platform.

BACKGROUND

At the present stage, AI training platforms generally perform model training based on mirror images in containers. In the case of distributed tasks, multiple containers are required to perform training simultaneously, and these containers may be located on one or more servers. On the other hand, services of AI platforms are basically micro-services, the AI platforms support containerizing deployment and the scheduling and management of Kubernetes (K8S), and have a fault tolerance capability. If the mirror image repository and mirror images of services malfunction, the containers running various services may be affected, resulting in problems in the functions of AI platforms. Therefore, it is essential for the management and maintenance of the mirror images and mirror image repository of AI platforms.

At present, in order to perform model training, mirror images for various deep learning frameworks need to be installed. Large AI platforms may have dozens to hundreds of different types of mirror images. It takes a lot of time and effort for the classification, retrieval, update of mirror images, data migration and backup, and the upgrade and maintenance of components.

For high concurrency and distributed training tasks, it is necessary to simultaneously pull multiple mirror images at a compute node. Due to high-strength and high concurrency operations of mirror images, it is necessary for the mirror image repository to have higher stability, reliability and fault tolerance. For deploying a harbor mirror image repository with a high availability, monitoring a health state of the harbor repository, handling various abnormalities of the harbor repository, and resuming services of the harbor repository in time, it is necessary for the AI platform to have good strategies and methods for processing mirror images.

Moreover, according to training requirements, different mirror images may be imported to the AI platform or the AI platform may build different mirrors images. The importing and building of mirror images will take a certain time since more than a gigabyte (G) is generally required for performing deep learning on mirror images. For highly concurrent importing and building of mirror images by multiple users, a mirror image processing module needs to have a high concurrency capability and a priority processing capability. In order to improve the user experience, a high concurrency scene needs to have functions of displaying queue positions and displaying a remaining building time, and also provides functions of displaying a progress and displaying real-time log and so on. Therefore, the mirror image management of the AI platform has high performance, and the AI platform is easy to use.

SUMMARY

In view of the above, an object of embodiments of the present disclosure is to provide an AI platform for performing model training based on mirror images. The AI platform can process mirror images such as service mirror images and deep learning, achieving accurate and refined management of the mirror images of the AI platform, and improving the stability and robustness of the AI platform. Syntax check of Dockerfile file, syntax command error prompt and format error prompt, etc. are achieved. Highly concurrent building and importing of mirror images are realized, the concurrent quality can be adjusted according to the resource utilization rate of central processing unit (CPU) and memory of the docker server, and the mirror image to be operated can be adjusted according to the priority, the progress of the mirror image being operated, the queue position and log information can be displayed in real time, deleting a task in the queuing state and terminating mirror images not requiring to be built and imported in time are supported. Recommended or manually selected component, such as jupyter, opencv, python, etc. will be automatically installed during the process of building and importing mirror images, so as to ensure that imported mirror images can be used to perform model training on the AI platform. According to the management strategy and method for mirror images, the mirror images of the AI training platform are diversified managed and maintained, improving the stability and reliability of AI platform.

In view of the above objects, an aspect of the present disclosure provides a method for processing mirror images of an AI platform, including:
  scanning, in response to receiving a mirror image building request, a file used for building a mirror image to detect whether a format and syntax of the file are correct, and building the mirror image according to the file in response to detecting that the format and syntax of the file are correct;
  selecting and installing, according to a type of the mirror image and component information, a component required for mirror image training in response to receiving a request for importing the mirror image to a training platform;
  adjusting queue positions of mirror images to be imported according to priorities of the mirror images, and importing the mirror images according to the queue positions;
  in response to receiving a model training request, classifying and recommending mirror images according to information about mirror images and information about training tasks, and performing a model training according to the mirror images selected; and
  in response to detecting that a storage of mirror images in a local disk space reaches a preset cleaning threshold, screening, according to usage information of the mirror images, the mirror images, and cleaning mirror images screened out.

In some embodiments of the method for processing mirror images of an AI platform provided in the present disclosure, the method further includes:

monitoring a health state of a mirror image repository in real time, and determining, in response to monitoring that the health state is abnormal, whether the mirror image repository is deployed with a high availability; and transferring traffic in the mirror image repository to a standby mirror image repository in response to determining that the mirror image repository is deployed with the high availability.

In some embodiments of the method for processing mirror images of an AI platform provided in the present disclosure, the method further includes:

detecting the health state of the mirror image repository at a preset time interval in response to determining that the mirror image repository is not deployed with the high availability, and sending abnormality prompt information in response to a number of detections reaching a preset number and determining that the health state is still abnormal.

In some embodiments of the method for processing mirror images of an AI platform provided in the present disclosure, the method further includes:

displaying, during building the mirror image, building progress information in real time according to a number of command lines, and displaying, via a log, a command execution process in real time.

In some embodiments of the method for processing mirror images of an AI platform provided in the present disclosure, the method further includes:

in response to determining that the building the mirror image is high concurrency building or the importing the mirror image is high concurrency importing, adjusting a quantity of concurrent mirror images according to a resource utilization rate of a CPU and a memory.

In some embodiments of the method for processing mirror images of an AI platform provided in the present disclosure, the method further includes:

periodically detecting and processing mirror images that are inconsistent in the training platform and a mirror image repository.

In some embodiments of the method for processing mirror images of an AI platform provided in the present disclosure, the scanning, in response to receiving a mirror image building request, a file used for building a mirror image to detect whether a format and syntax of the file are correct further includes:

prompting incorrect information and feeding back a modification example and modification suggestions in response to detecting that the syntax and format of the file are incorrect.

Another aspect of the present disclosure further provides a device for processing mirror images of an AI platform, including:

a file detection module, configured to: scan, in response to receiving a mirror image building request, a file used for building a mirror image to detect whether a format and syntax of the file are correct, and build the mirror image according to the file in response to detecting that the format and syntax of the file are correct;

a component installation module, configured to select and install, according to a type of the mirror image and component information, a component required for mirror image training in response to receiving a request for importing the mirror image to a training platform;

a mirror image importing module, configured to adjust queue positions of mirror images to be imported according to priorities of the mirror images, and import the mirror images according to the queue positions;

a model training module, configured to, in response to receiving a model training request, classify and recommend mirror images according to information about mirror images and information about training tasks, and perform a model training according to the mirror image selected; and a mirror image cleaning module, configured to, in response to detecting that a storage of the mirror images in a local disk space reaches a preset cleaning threshold, screen, according to usage information about the mirror images, the mirror images and clean mirror images screened out.

In some embodiments of the device for processing mirror images of an AI platform provided in the present disclosure, the method further includes:

a health state monitoring module, configured to: monitor a health state of a mirror image repository in real time; determine whether the mirror image repository is deployed with a highly availability in response to monitoring that the health state is abnormal; and transfer traffic in the mirror image repository to a standby mirror image repository in response to determining that the mirror image repository is deployed with the high availability.

In some embodiments of the device for processing mirrors images of an AI platform provided in the present disclosure, the method further includes:

a concurrent quantity configuration module, configured to, in response to determining that the mirror images are built or imported in a high concurrency way, adjust a quantity of concurrent mirror images according to a resource utilization rate of a CPU and memory.

The present application at least has advantageous technical effects described below. The present application can be used on an AI platform to manage mirror images, and has capabilities of Dockerfile detection, importing a mirror image component recommendation and installing component automatically, monitoring and resuming a harbor service, monitoring and cleaning mirror images of a node, and recommending mirror images for training, etc., thereby ensuring the stability, robustness and ease of use of the AI platform to a certain extent, and improving the management capability of mirror images of the AI platform and the overall efficiency of model training.

BRIEF DESCRIPTION OF THE DRAWINGS

The accompanying drawings as used in the description of embodiments of the present disclosure or related art will be briefly introduced below so as to clearly illustrate solutions of the embodiments or the related art. It is apparent that the accompanying drawings in the following description illustrate merely some embodiments of the present disclosure, and those skilled in the art may obtain other embodiments based on these accompanying drawings without paying any creative efforts. In the figures.

DETAILED DESCRIPTION OF THE EMBODIMENTS

In order to make objectives, solutions and advantages of the present application clearer, the present application will be further described in detail below in conjunction with the accompanying drawings and specific embodiments.

It should be noted that the terms "first", "second" as used in the embodiments of the present disclosure are used to distinguish different objects with the same name or different parameters. In other words, the terms "first", "second" are merely used for easy description, rather than limiting the embodiments, which will not be repeatedly described in the embodiments.

Figure 1:
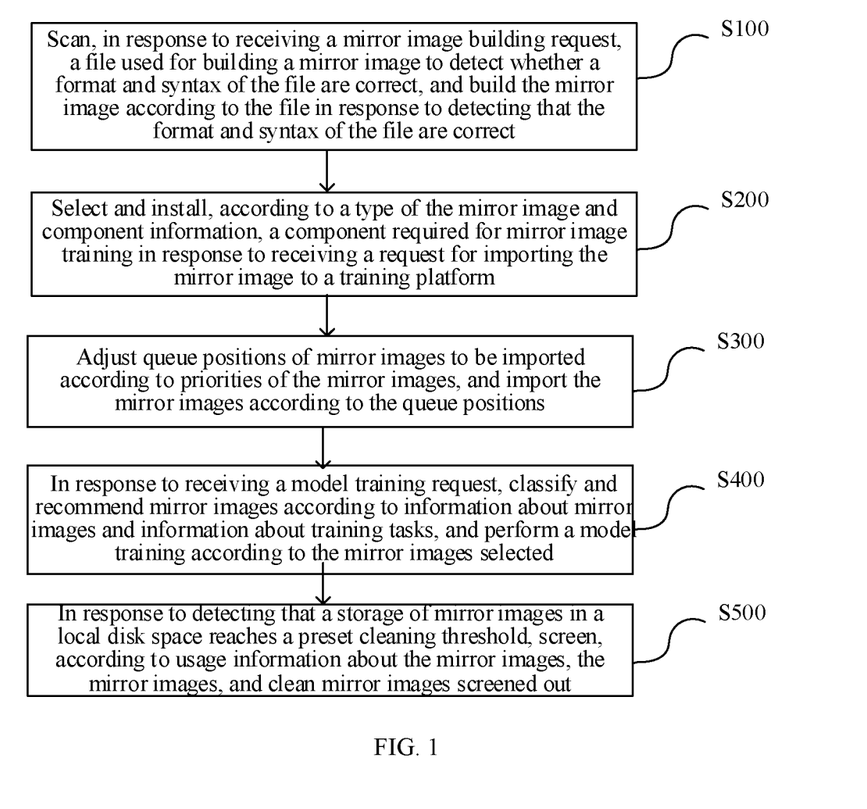
FIG. 1 is a schematic block diagram illustrating an embodiment of a method for processing mirror images of an AI platform according to the present disclosure.

In view of the above objects, a first aspect of embodiments of the present disclosure provides a method for processing mirror images of an AI platform. FIG. 1 is a schematic block diagram illustrating a method for processing mirror images of an AI platform according to an embodiment of the present disclosure. In the embodiment shown in FIG. 1, the method at least includes steps described below.

In S100, in response to receiving a mirror image build request, a file used for building a mirror image is scanned to detect whether the syntax and format of the file are correct, and a mirror image is built according to the file if it is detected that the syntax and format of the file are correct.

In S200, a component required for mirror image training is selected and installed according to a type of the mirror image and component information, in response to receiving a request for importing the mirror image to a training platform.

In S300, queue positions of mirror images to be imported are adjusted according to the priorities of the mirror images, and the mirror images are imported according to the queue positions.

In S400, in response to receiving a model training request, mirror images are classified and recommended according to information about mirror images and information about training tasks, and the model training is performed according to the selected mirror images.

In S500, in response to detecting that storage of the mirror images in a local disk space reaches a preset cleaning threshold, the mirror images are screened according to usage information of the mirror images, and the mirror images screened out are cleaned up.

In some embodiments of the present disclosure, large data sets and multiple types of mirror images are required for performing model training on compute nodes, thus resource consumption of the CPU, memory and hard disk is relatively high. When the disk space of the mirror image repository at the compute node reaches the preset cleaning threshold (a configurable cleaning threshold) set, the mirror images are screened according to the usage frequency, the pull time and the latest usage time of the mirror images of the compute node. After the size of the screened out mirror images satisfies the minimum threshold (configurable) requirements of the disk space, the screening is stopped, and then the mirror images screened out are deleted, achieving automatic cleaning of local mirror images of the node and ensuring sufficient training resources. The specific implementation process is described below.

First, due to configuration file supporting flexible configuration and one-click deployment capability, a tool (device) can be adapted to the AI platform, or be used by an external device through encapsulated Application Programming Interface (API). Moreover, the device has the capability of containerizing deployment. According to step S100, upon completion of deployment, the method and tool provide services to the outside. When building a mirror image by using Dockerfile, the tool scans the Dockerfile, performs syntax checking and format checking, and provides prompts and modification examples and suggestions. During the building process, the progress information is displayed in real time according to the number of execution lines/total number of command lines, and a command execution process is displayed via the log in real time. When an abnormality occurs, a specific reason for the abnormality will be presented, and the abnormal data will be cleaned.

According to step S200, the tool can realize functions of internal importing mirror images and external importing mirror images, and a mirror image tar package is internal imported, the tar package can be automatically distinguished to determine whether it is exported from export or save, and then importing is executed. For external importing, mirror images of external network repository can be pulled online and imported to the AI platform. During the process of importing, it is automatically detected whether the mirror image has the component required for AI training, and if not, automatic recommendation and automatic installation of the component will be realized according to the type of the mirror image, the use frequency of component and the installation times of component; meanwhile, a component list will be provided to support manual selection and installation of component.

According to step S300, the imported mirror images can be adjusted according to the priorities thereof, and a designated mirror image can be processed preferentially, and the task training can be performed in time, so as to shorten the waiting time. At the same time, the progress and queue position of the mirror image being operated, and log information are displayed in real time, so that the user can know the conditions of the building in real time. It is supported to delete the task in the queue state, terminate the mirror images not requiring to be built and imported in time, thereby improving the usability and robustness of the AI platform. It is supported to delete the task in the queue state, terminate the imported mirror in time.

According to step S400, the AI platform generally has various types of mirror images, and tens or hundreds of mirror images. The tool will classify and recommend the mirror images according to the types of mirror images, the task of mirror training, the star level of the mirror image and the number of uses, so as to determine which mirror image should be selected for model training. Alternatively, a user can also search and specify mirror images required for training by himself. When submitting a training task, if a mirror image in the harbor repository is deleted at the same time, this tool will give a prompt and recommend a similar mirror image for use, improving the fault tolerance of the platform.

According to step S500, to perform model training, the compute node needs a large data set and multiple types of mirror images, thus the resource consumption of the hard disk is relatively high. The tool has the capability of detecting and cleaning local mirror images of each compute node. When the disk space of the mirror repository of the compute node reaches a set deletion threshold (configurable), a deletion strategy will be triggered. Specifically, local mirror images are screened according to the usage frequency, pull time and latest usage time of local mirror images of the compute node until the size of the mirror images screened out meets the minimum threshold (configurable) requirements of the disk space. Then, the local mirror images screened out are deleted, so as to realize the automatic cleaning of local mirror images of the node and ensure sufficient training resources.

According to some embodiments of the method for processing mirror images of an AI platform provided by the present disclosure, the method further includes:
  monitoring a health state of a mirror image repository in real time, and determining, in response to monitoring an abnormality of the health state, whether the mirror image repository is deployed with a high availability; and
  transferring, in response to determining that the mirror image repository is deployed with the high availability, traffic in the mirror image repository to a standby mirror image repository.

In some embodiments of the present disclosure, the monitoring service of the tool monitors the health state of the service of the harbor repository in real-time. If an abnormality occurs in the status of a container of the harbor service, rendering the harbor repository unusable, the monitoring service automatically resumes the abnormal service. If the harbor repository is deployed with the high availability, harbor VIP will automatically drift to a standby harbor server during recovery without affecting functions of services.

According to some embodiments of the method for processing mirror images of an AI platform of the present disclosure, the method further includes:
  detecting, in response to determining that the mirror image repository is not deployed with the high availability, the health state of the mirror image repository at a preset time interval, and sending abnormality prompt information in response to the number of detections reaching a preset number and determining that the health state is still abnormal.

In some embodiments of the present disclosure, the health state of a harbor service is monitored in real time. The monitoring service has a function of running on startup, can autonomously process and solve the problems of network bridge abnormality of harbor services, container state abnormality of harbor services, port occupancy of harbor containers, harbor container abnormality, harbor mirror image abnormality, the problem that harbor services cannot be started due to restarting of the server, and automatically resume harbor services. Working in conjunction with the business layer, there is a detection and waiting mechanism. In the case that the mirror image repository is not deployed with the high availability, during resuming services, the detection and waiting mechanism will be triggered if the AI platform operates mirror images and finds that the harbor repository is abnormal. The waiting time for each detection increases (the previous waiting time*2, the basic waiting time is 30 s). After 10 detections in total, an abnormality prompt will be given if the harbor repository has not resumed to normal; and normal business processes will be continued if the harbor repository has resumed to normal. Therefore, the fault tolerance of the platform is improved. The monitoring service typically resumes harbor services in about 1 minute. The monitoring service has functions of running on startup, and has the capability of solving problems of network bridge abnormality of harbor services, container state abnormality of harbor services, port occupancy of harbor containers, harbor container abnormality, harbor mirror image abnormality, and the problem that harbor services cannot be started due to restarting of the server, thereby ensuring the robustness of the harbor repository.

According to some embodiments of the method for processing mirror images of an AI platform of the present disclosure, the method further includes:
  in a process of building a mirror image, displaying the progress information of the building in real time according to the number of command lines, and displaying a process of executing a command via a log in real time.

In some embodiments of the present disclosure, the present tools can be extracted as component and tool modules, nested into different artificial intelligence platforms, supporting configurable externally provided API and being used via the API interface. The method and tool can be used to automatically detect mirror image file Dockerfile, detect whether commands in the Dockerfile comply with the syntax command specification, support on-line and off-line mirroring through Dockerfile, and provide real-time log interface to track the building process. The functions of importing mirror images from outside and importing mirror images from inside are provided. During the process of importing mirror images, the component required for AI platform training is automatically installed. The installation component is automatically recommended according to the type of the mirror image, the use frequency of the component and the installation times of the component, and a component list is provided to facilitate manual selection.

In the building process, a mirror image management module of the AI platform is configured to display the progress information in real time, and display a production process log in real time. If an abnormality occurs, the log will present a specific reason for the abnormality, and the abnormality data in the background is cleaned up, thereby realizing modification at any time and re-production at any time.

According to some embodiments of the method for processing mirror images of an AI platform of the present disclosure, the method further includes:
  adjusting, according to the resource utilization rate of the CPU and memory, the quality of the concurrent mirror images in response to determining that the building or importing of mirror images is high concurrent building or importing.

In some embodiments of the present disclosure, mirror images for the deep learning are generally large, for example larger than 1G. Thus, importing, by multiple users, mirror images in a high concurrent way leads to serious consumption of platform resources. The tool supports high concurrency, and the concurrent quality can be adjusted according to the resources utilization rate of CPU and memory of the docker server.

According to some embodiments of the method for processing mirror images of an AI platform of the present disclosure, the method further includes:
  periodically detecting and processing mirror images that are inconsistent in the training platform and the mirror image repository.

In some embodiments of the present disclosure, the harbor repository is the base of mirror images at the AI platform, and the stability and reliability of the harbor repository are crucial to the mirror images at the AI platform. The present disclosure is also directed to the harbor repository, realizing the high availability of the harbor, realizing the synchronization of the mirror images of the master and slave harbor nodes, ensuring the consistency of data, and using the mirror images in the harbor repository via virtual IP address (VIP). This tool will periodically detect the consistency of mirror images at the AI platform and harbor repository, and periodically process inconsistent mirror image records. For AI platforms, when selecting a mirror image to submit a training task, if the mirror image in the harbor repository is deleted at the same time, this tool will give a prompt and recommend a similar mirror image for its use, improving the fault tolerance of the platform.

According to some embodiments of the method for processing mirror images of an AI platform of the present disclosure, the file used for building a mirror image is scanned, in response to receiving a mirror image building request, to detect whether the syntax and format of the file are correct by:

presenting incorrect information and feeding back modification examples and modification suggestions in response to detecting that the syntax and format of the file are incorrect.

In some embodiments of the present disclosure, the tool introduces a Dockerfile syntax library, and a command description document, so as to perform syntax detection and prompt for Dockerfile, and perform format check and prompt for format error, thereby supporting online modification and edition of Dockerfile.

Figure 2:
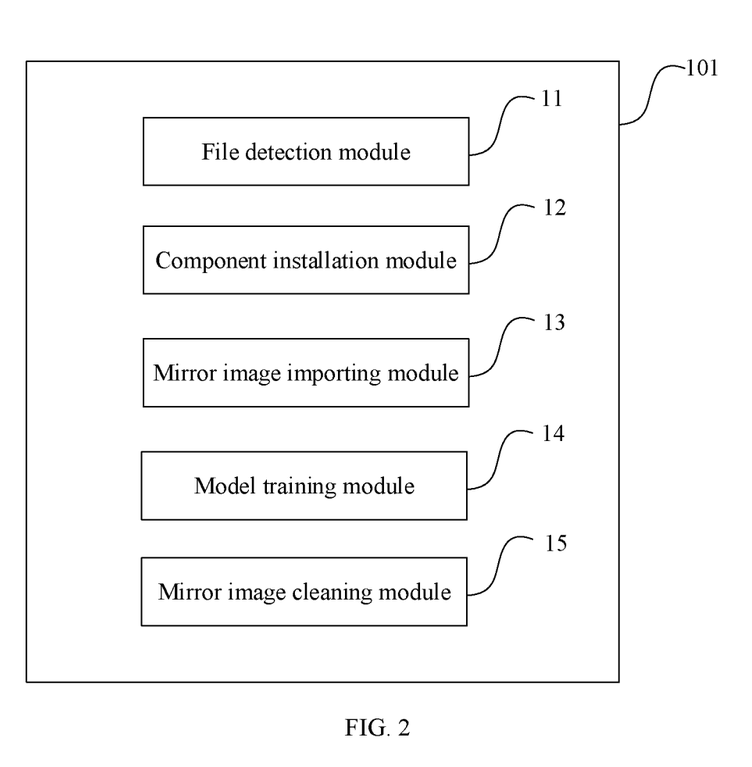
FIG. 2 is a schematic block diagram illustrating an embodiment of a device for processing mirror images of an AI platform according to the present disclosure.

Another aspect of embodiments of the present disclosure provides a device for processing mirror images of an AI platform. The device 101 includes a file detection module 11, a component installation module 12, a mirror image importing module 13, a model training module 14 and a mirror image cleaning module 15.

The file detection module 11 is configured to: scan, in response to receiving a mirror image building request, a file used for building the mirror image to detect whether the syntax and format of the file are correct; and build the mirror image according to the file in response to detecting that the syntax and format of the file are correct.

The component installation module 12 is configured to: in response to receiving a request for importing the mirror image to a training platform, select and install a component required for mirror image training according to a type of the mirror image and component information.

The mirror image importing module 13 is configured to adjust queue positions of the mirror images to be imported according to the priorities of the mirror images, and import the mirror images according to the queue positions.

The model training module 14 is configured to: in response to receiving a model training request, classify and recommend mirror images according to information about mirror images and information about training tasks, and perform model training according to selected mirror images.

The mirror image cleaning module 15 is configured to, in response to detecting that a storage of mirror images in a local disk space reaches a preset cleaning threshold, screen mirror images according to usage information of the mirror images and clean mirror images screened out.

According to some embodiments of the device for processing mirror images of an AI platform of the present disclosure, the device 101 further includes:

a health state monitoring module configured to: monitor a health state of a mirror image repository in real time, and determine, in response to monitoring an abnormality of the health state, whether the mirror image repository is deployed with a high availability; and transfer, in response to determining that the mirror image repository is deployed with a high availability, traffic in the mirror image repository to a standby mirror image repository.

According to some embodiments of the device for processing mirror images of an AI platform of the present disclosure, the device 101 further includes:

a concurrency amount configuration module configured to: in response to determining that building or importing of mirror images is high concurrent building or importing, adjust the concurrent quality of the mirror images according to the resource utilization rate of the CPU and memory.

Therefore, the method and tool are used for training mirror images for AI models, can automatically detect and scan when building or importing mirror images, automatically recommend or manually select and install the component needed for training according to the strategy, and process, according to the priority and queuing strategy, mirror images with high priority while being imported or pulled first, and process classification according to the type of mirror images after success. When submitting training tasks, training mirror images automatically classified, sorted and recommended can be selected according to the strategy, and the required mirror images can also be retrieved. Moreover, the mirror images of the node are managed, the mirror images of the compute node are automatically cleaned according to a deletion strategy, thereby guaranteeing sufficient training resources of the compute node. The harbor repository is monitored, so as to guarantee high availability of the harbor repository and the health state of services, which is of great significance to improve the stability and reliability of the whole AI platform.

Similarly, those skilled in the art should understand that all the implementations, features and advantages described above for the method for AI platform image processing according to the present disclosure are also applicable to the device according to the present disclosure. For the sake of brevity, the description is not repeated here.

Figure 3:
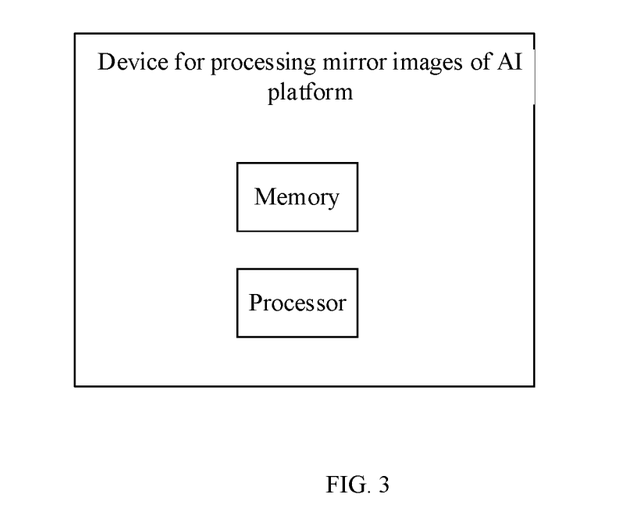
FIG. 3 is a schematic block diagram illustrating another embodiment of a device for processing mirror images of an AI platform according to the present disclosure.

Further, the present application further provides a device for processing mirror images of an AI platform of the present disclosure, which is described in term of hardware. FIG. 3 illustrates another device for processing mirror images of an AI platform according to an embodiment of the present application. The device includes: a memory, configured to store a computer program; and a processor, configured to, when performing the computer program, implement the steps of the method according to any one of the above embodiments.

It should be pointed out that those skilled in the art can understand that all or part of the processes in the methods of the above embodiments can be implemented by instructing relevant hardware through computer programs. The program of the AI platform image processing method can be stored in a computer readable storage medium. When the program is executed, it may include the procedures of the embodiments of the above-mentioned methods. The storage medium for the program may be a magnetic disk, an optical disk, a read-only memory (ROM) or a random access memory (RAM). The foregoing computer program embodiments can achieve the same or similar effects as any of the foregoing method embodiments corresponding thereto.

Those skilled in the art would also appreciate that various illustrative logical blocks, modules, circuits, and algorithm steps described in connection with the disclosure herein may be implemented as electronic hardware, computer software, or combinations of both. To clearly illustrate the interchangeability of hardware and software, various illustrative components, blocks, modules, circuits, and steps have been described generally in terms of their functionality.

Whether such functionality is implemented as software or as hardware depends upon the particular application and design constraints imposed on the overall system. Those skilled in the art may implement the functions in various ways for each specific application, but such implementation decisions should not be interpreted as causing a departure from the scope disclosed in the embodiments of the present disclosure.

It should be understood that as used herein, the singular form "a" and "an" are intended to include the plural forms as well, unless the context clearly supports an exception. It should also be understood that "and/or" as used herein is meant to include any and all possible combinations of one or more of the associated listed items.

The serial numbers of the embodiments disclosed in the above-mentioned embodiments are only for description, and do not represent the advantages and disadvantages of the embodiments.

Those skilled in the art should understand that the discussion of any of the above embodiments is exemplary only, and is not intended to imply that the scope (including claims) of the embodiments of the present disclosure is limited to these examples. Under the idea of the embodiments of the present disclosure, the technical features in the above embodiments or different embodiments can also be combined, and there are many other changes in different aspects of the above embodiments of the present disclosure, which are not provided in details for the sake of brevity. Therefore, within the spirit and principle of the embodiments of the present disclosure, any omissions, modifications, equivalent replacements, improvements, etc., shall be included in the protection scope of the embodiments of the present disclosure.

The invention claimed is:

1. A method for processing mirror images of an artificial intelligence (AI) training platform, comprising:
scanning, in response to receiving a mirror image building request, a file used for building a mirror image to detect whether a format and syntax of the file are correct, and building the mirror image according to the file in response to detecting that the format and syntax of the file are correct;
selecting and installing, according to a type of the mirror image and component information, a component required for mirror image training in response to receiving a request for importing the mirror image to the training platform;
adjusting queue positions of mirror images to be imported according to priorities of the mirror images, and importing the mirror images according to the queue positions;
in response to receiving a model training request, classifying and selecting mirror images according to information about mirror images and information about training tasks, and performing a model training according to the mirror images selected;
in response to detecting that a storage of mirror images in a local disk space reaches a preset cleaning threshold, screening, according to usage information of the mirror images in the local disk space, the mirror images in the local disk space, and cleaning mirror images screened out;
monitoring a health state of a mirror image repository in real time, and determining whether a standby mirror image repository is provided in response to monitoring that the health state is abnormal;
in response to determining that the standby mirror image repository is provided, transferring traffic in the mirror image repository to the standby mirror image repository;
in response to determining that the standby mirror image repository is not provided, detecting the health state of the mirror image repository at a preset time interval, and sending abnormality prompt information in response to a number of detections reaching a preset number and determining that the health state is still abnormal;
displaying a progress and queue positions of the mirror image being operated, and log information in real time; deleting tasks in queue state; and terminating mirror images not requiring to be built and imported; or any combination thereof;
wherein the classifying and selecting mirror images according to information about mirror images and information about training tasks comprises: in response to the selected mirror images in the mirror image repository being deleted, displaying a prompt and recommending a mirror image similar to the selected mirror images; and
wherein the detecting the health state of the mirror image repository comprises:
rebooting the mirror image repository;
detecting the health state of the mirror image repository after waiting for a first period; and
in response to detecting that the mirror image repository is abnormal, rebooting the mirror image repository after a second period, the second period is longer than the first period.

2. The method according to claim 1, further comprising:
displaying, during building the mirror image, building progress information in real time according to a number of command lines, and displaying, via a log, a command execution process in real time.

3. The method according to claim 1, further comprising:
in response to determining that the building the mirror image is high concurrency building or the importing the mirror images is high concurrency importing, adjusting a quantity of concurrent mirror images according to a resource utilization rate of a Central Processing Unit (CPU) and a memory.

4. The method according to claim 1, further comprising:
periodically detecting and processing mirror images that are inconsistent in the training platform and the mirror image repository.

5. The method according to claim 4, wherein the detecting and processing mirror images that are inconsistent in the training platform and the mirror image repository comprises detecting a consistency of mirror images at the AI platform and a harbor repository.

6. The method according to claim 1, wherein the scanning, in response to receiving the mirror image building request, the file used for building a mirror image to detect whether a format and syntax of the file are correct further comprises:
prompting incorrect information and feeding back a modification example and modification suggestions in response to detecting that the syntax and format of the file are incorrect.

7. The method according to claim 1, wherein the file used for building the mirror image is Dockerfile.

8. The method according to claim 1, wherein before selecting and installing, according to a type of the mirror image and component information, a component required for mirror image training, the method further comprises:
  detecting whether the mirror image has a component required for AI training.

9. The method according to claim 8, wherein in response to detecting that the mirror image does not have the component required for AI training, the component is automatically recommended and installed according to the type of the mirror image, a use frequency of the component and installation times of the component.

10. The method according to claim 1, wherein the adjusting queue positions of mirror images to be imported according to priorities of the mirror images comprises designating a mirror image to be processed preferentially.

11. The method according to claim 1, wherein the classifying and selecting mirror images according to information about mirror images and information about training tasks comprises classifying and selecting the mirror images to be classified and selected according to types of the mirror images, a task of mirror training, a star level of the mirror images and a number of uses.

12. The method according to claim 1, wherein the usage information of the mirror images comprises a usage frequency, a pull time and a latest usage time of the mirror images.

13. The method according to claim 1, wherein the detecting the health state of the mirror image repository comprises detecting the health state of a harbor repository.

14. The method according to claim 13, wherein the health state of the harbor repository is abnormal due to at least one of network bridge abnormality of harbor services, container state abnormality of harbor services, port occupancy of harbor containers, harbor container abnormality, and harbor mirror image abnormality.

15. A device for processing mirror images of an artificial intelligence (AI) training platform, comprising a processor and a memory, wherein the memory stores a computer program, and the processor is configured to call the computer program stored in the memory and run the computer program to:
  scan, in response to receiving a mirror image building request, a file used for building a mirror image to detect whether a format and syntax of the file are correct, and build the mirror image according to the file in response to detecting that the format and syntax of the file are correct;
  select and install, according to a type of the mirror image and component information, a component required for mirror image training in response to receiving a request for importing the mirror image to the training platform;
  adjust queue positions of mirror images to be imported according to priorities of the mirror images, and import the mirror images according to the queue positions;
  in response to receiving a model training request, classify and select mirror images according to information about mirror images and information about training tasks, and perform a model training according to the mirror images selected;
  in response to detecting that a storage of the mirror images in a local disk space reaches a preset cleaning threshold, screen, according to usage information of the mirror images in the local disk space, the mirror images in the local disk space and clean mirror images screened out;
  monitor a health state of a mirror image repository in real time, and determine whether a standby mirror image repository is provided in response to monitoring that the health state is abnormal;
  in response to determining that the standby mirror image repository is provided, transfer traffic in the mirror image repository to the standby mirror image repository;
  in response to determining that the standby mirror image repository is not provided, detect the health state of the mirror image repository at a preset time interval, and send abnormality prompt information in response to a number of detections reaching a preset number and determining that the health state is still abnormal;
  displaying a progress and the queue positions of the mirror images being operated, and log information in real time; deleting tasks in queue state; and terminating mirror images not requiring to be built and imported; or any combination thereof;
  in response to the selected mirror images in the mirror image repository being deleted, display a prompt and recommend a mirror image similar to the selected mirror images;
  reboot the mirror image repository;
  detect the health state of the mirror image repository after waiting for a first period; and
  in response to detecting that the mirror image repository is abnormal, reboot the mirror image repository after a second period, the second period is longer than the first period.

16. The device according to claim 15, wherein the processor is further configured to:
  in response to determining that the mirror image is built or the mirror images are imported in a high concurrency way, adjust a quantity of concurrent mirror images according to a resource utilization rate of a Central Processing Unit (CPU) and memory.

17. A non-transitory computer-readable storage medium storing programs that, when executed by a processor, cause the processor to perform a method for processing mirror images of an artificial intelligence (AI) training platform, comprising:
  scanning, in response to receiving a mirror image building request, a file used for building a mirror image to detect whether a format and syntax of the file are correct, and building the mirror image according to the file in response to detecting that the format and syntax of the file are correct;
  selecting and installing, according to a type of the mirror image and component information, a component required for mirror image training in response to receiving a request for importing the mirror image to a training platform;
  adjusting queue positions of mirror images to be imported according to priorities of the mirror images, and importing the mirror images according to the queue positions;
  in response to receiving a model training request, classifying and selecting mirror images according to information about mirror images and information about training tasks, and performing a model training according to the mirror image selected;
  in response to detecting that a storage of mirror images in a local disk space reaches a preset cleaning threshold, screening, according to usage information of the mirror images in the local disk space, the mirror images in the local disk space, and cleaning mirror images screened out;

monitoring a health state of a mirror image repository in real time, and determining whether a standby mirror image repository is provided in response to monitoring that the health state is abnormal;

in response to determining that the standby mirror image repository is provided, transferring traffic in the mirror image repository to the standby mirror image repository;

in response to determining that the standby mirror image repository is not provided, detecting the health state of the mirror image repository at a preset time interval, and sending abnormality prompt information in response to a number of detections reaching a preset number and determining that the health state is still abnormal;

displaying a progress and the queue positions of the mirror images that are being operated, and log information in real time; deleting tasks in queue state; and terminating mirror images not requiring to be built and imported; or any combination thereof;

wherein the classifying and selecting mirror images according to information about mirror images and information about training tasks comprises: in response to the selected mirror images in the mirror image repository being deleted, displaying a prompt and recommending a mirror image similar to the selected mirror images; and wherein the detecting the health state of the mirror image repository comprises:

rebooting the mirror image repository;

detecting the health state of the mirror image repository after waiting for a first period; and in response to detecting that the mirror image repository is abnormal, rebooting the mirror image repository after a second period, the second period is longer than the first period.

* * * * *